UNITED STATES PATENT OFFICE.

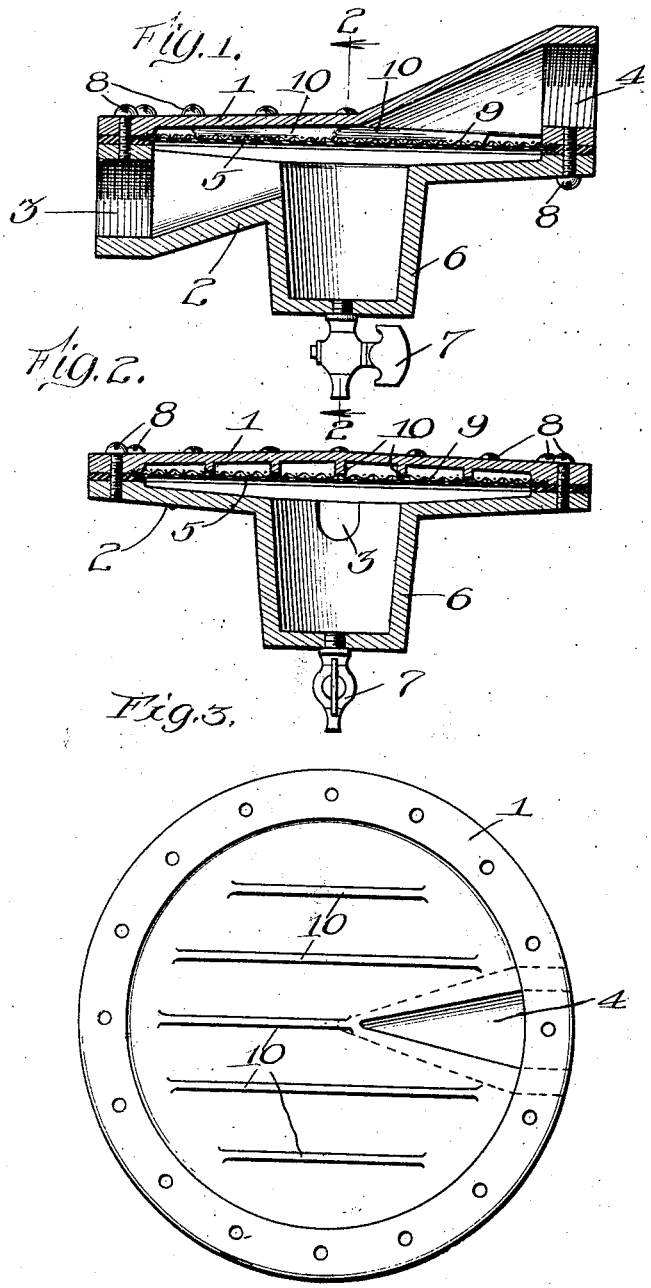

ALLEN A. BOWSER, OF FORT WAYNE, INDIANA, ASSIGNOR TO S. F. BOWSER & COMPANY, OF FORT WAYNE, INDIANA, A CORPORATION OF INDIANA.

FILTER.

No. 896,353.  Specification of Letters Patent.  Patented Aug. 18, 1908.

Application filed June 23, 1906. Serial No. 323,043.

*To all whom it may concern:*

Be it known that I, ALLEN A. BOWSER, a citizen of the United States, residing at Fort Wayne, in the county of Allen and State of Indiana, have invented certain new and useful Improvements in Filters, of which the following is a full, clear, and exact specification.

This invention relates especially to filters for filtering gasolene and similar liquids, and has for its primary object to provide an improved and simple form of filter which may be placed in the gasolene pipe at any desired point in the length thereof, and which will serve to arrest water and dirt and catch the same in such a way that they may be drawn off without any material loss of the gasolene.

With a view to the attainment of these ends, and the accomplishment of certain other objects which will hereinafter appear, the invention consists in the features of novelty which will now be described with reference to the accompanying drawings, and more particularly pointed out in the claims.

In the said drawings—Figure 1 is a vertical longitudinal section of a filter embodying this invention. Fig. 2 is a transverse section thereof taken on the line 2, 2, Fig. 1. And Fig. 3 is a plan view showing the face of the upper half or cover.

The body or casing of the filter is composed of two main members, 1, 2, in one of which is formed an inlet 3, which may be tapped for a pipe connection, while in the other is formed an outlet 4, which may be similarly tapped. These two members 1, 2, as shown in plan view, have considerable area or width, while their depth is but slight, and clamped between their meeting faces is a diaphragm 5 of chamois-skin, through which the gasolene readily passes, but through which the water and dirt cannot pass but fall in the lower half of the body or casing into a blow-off cup or receiver 6, having a blow-off cock 7. The two main members of the filter casing are thus firmly bound together on the edges of the chamois-skin diaphragm by screws 8, or other suitable means, and in order that the pressure may not unduly distort the chamois diaphragm, it is reinforced on the upper side, or side removed from the gasolene pressure, by a wire-gauze diaphragm 9, also clamped between the meeting faces of the members 1, 2. This in turn is reinforced by a number of ribs 10 formed on the upper section or member 1, and extending across the wire-gauze diaphragm at suitable intervals, as shown in Fig. 3, these being preferably arranged in the direction of flow, so as not to interfere with the free discharge of the filtrate.

I claim:

In the device for the purpose described, the combination of a flat or shallow casing embodying two separable members, one having an inlet and the other an outlet formed in the edges thereof, the member having the inlet opening being also provided with a trap, a diaphragm composed of chamois skin dividing said casing into an inlet compartment and an outlet compartment and having its edges between said members, and spaced ribs formed along the inner face of one of the members in which the outlet is formed in the direction from the inlet to the outlet and bearing against said diaphragm, said members being secured together so that the inlet and outlet openings will be disposed diametrically opposite to each other and with the trap located between the inlet and the outlet openings.

In testimony whereof I have signed my name to this specification, in the presence of two subscribing witnesses, on this 18th day of June A. D. 1906.

ALLEN A. BOWSER

Witnesses:
WILLIAM A. BUSCH,
C. F. HATMAKER.